June 21, 1949.  J. C. KEPHART  2,474,182
PRESERVATION OF PIGMENTS IN ALFALFA
Filed Feb. 26, 1947  2 Sheets-Sheet 1
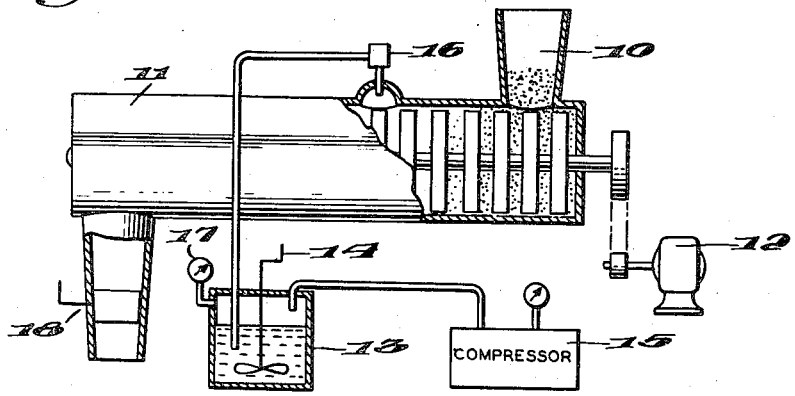
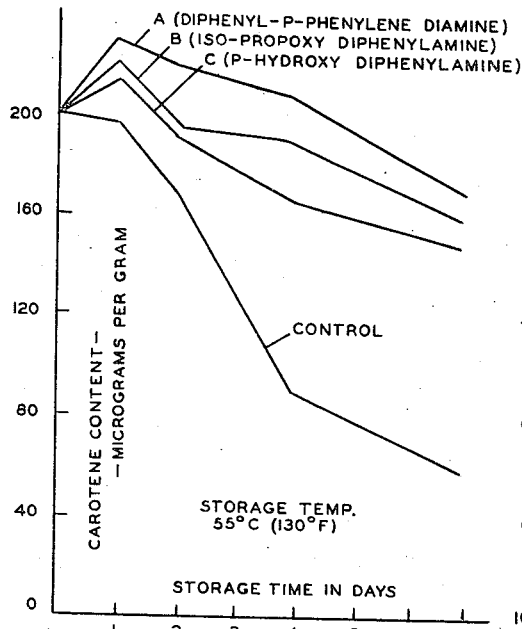
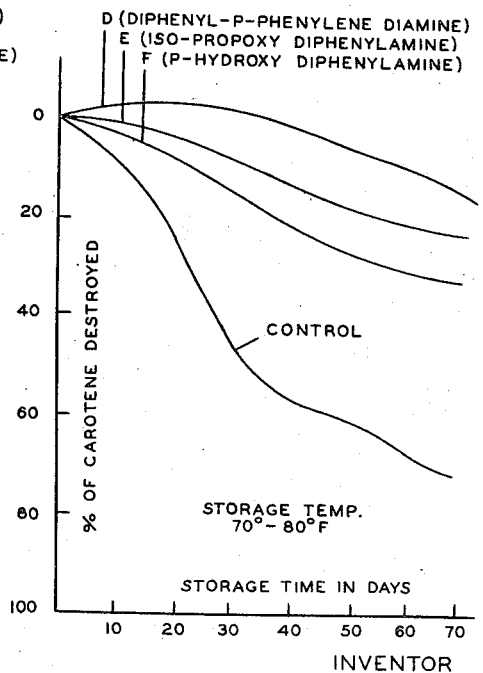
INVENTOR
JOHN C. KEPHART
By Hall + Houghton
Attorney

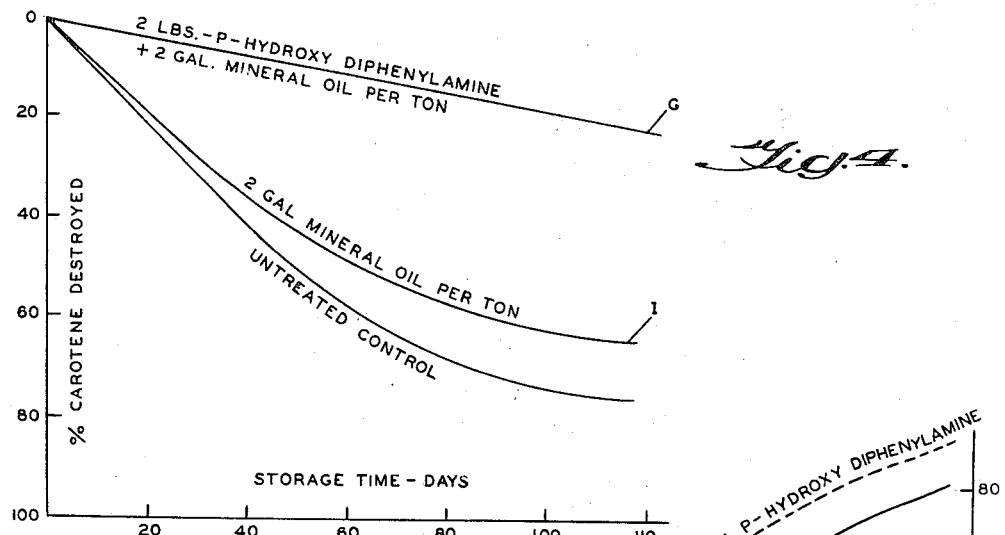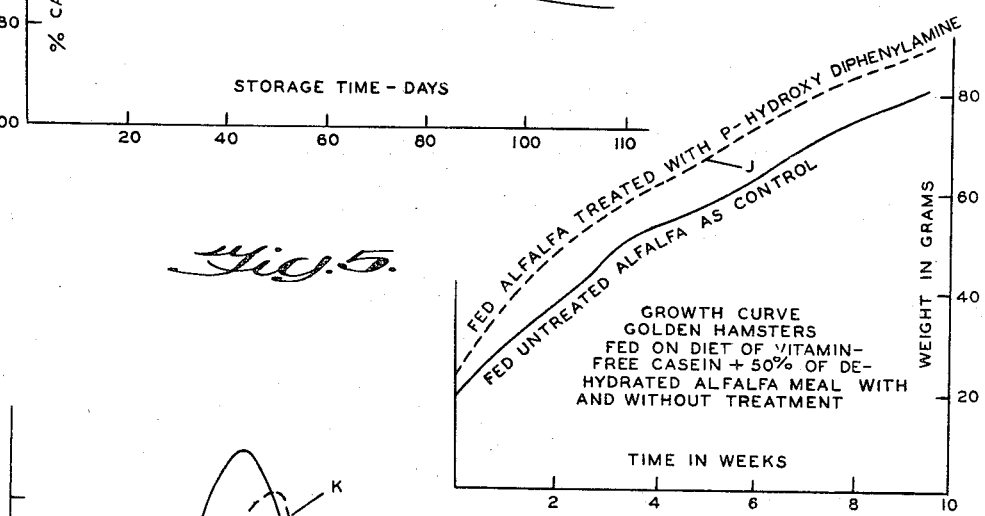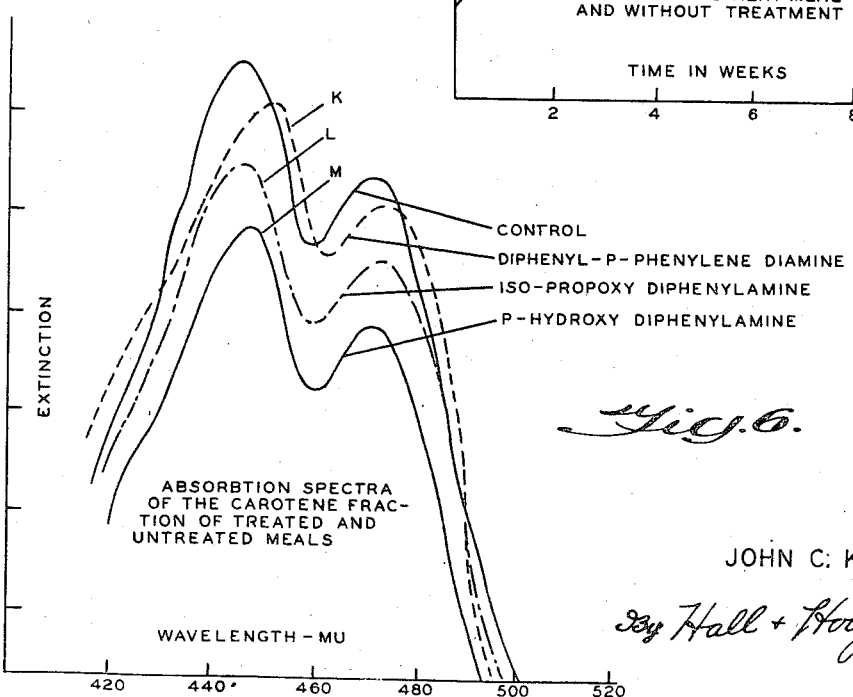

Patented June 21, 1949

2,474,182

UNITED STATES PATENT OFFICE 2,474,182

PRESERVATION OF PIGMENTS IN ALFALFA

John C. Kephart, Lamar, Colo., assignor to National Alfalfa Dehydrating and Milling Company, Lamar, Colo., a corporation of Delaware Application February 26, 1947, Serial No. 731,117

21 Claims. (Cl. 99—8)

This invention relates to the preservation of pigments in alfalfa and the like, and more particularly to a method of reducing the loss of carotene (pro-vitamin A) in dehydrated alfalfa meal.

It is well known that fresh alfalfa has a relatively high content of carotene, but that sun-curing of the alfalfa causes an initial loss of a large part of the carotene, chlorophyll, xanthophyll and like content, and that the loss continues progressively in the cured alfalfa during storage.

As alfalfa meal is employed in mixed feeds, dog food, and other food preparations, as a source of vitamin A, there is demand for alfalfa meal having a high carotene content, and demand for such meal having the rich green color indicative of such content, rather than the paler, faded color indicative of loss by decomposition of these values.

Because of this fact it has heretofore been the practice to artificially dehydrate alfalfa with the aim of lessening the initial loss of these pigments to produce an alfalfa meal having a larger initial content of the nutrient carotene, and a richer green color indicative of the fact that less of the pigments have been destroyed.

While the dehydration procedure reduces somewhat the loss of carotene during the drying of the alfalfa, nevertheless the rapid loss of the pigments in the dehydrated meal in storage makes it difficult to maintain adequate amounts of vitamin A in mixed feeds and the like throughout the entire year.

Packing under vacuum, or inert gas, or at greatly reduced temperatures, has been proposed for the purpose of retarding the carotene loss in the dehydrated alfalfa, but such procedures are expensive and fail to solve the problem. Moreover, such procedures, unless applied to the mixed feed, do not retard the loss of carotene after incorporation of the alfalfa therein. Proposed chemical treatments have been of questionable value because of the relatively large quantities of high cost chemicals needed and the likelihood that such chemicals might produce toxic effects, or interfere with the ultimate conversion of the carotene into vitamin A.

In light of the foregoing, a major object of the present invention is to provide a safe, inexpensive, and effective method of treating alfalfa meal and the like to retard the decomposition of at least one of its pigment elements, more particularly the carotene content.

An equally important object is to provide a dehydrated alfalfa meal conditioned to retain its pigment elements, and more particularly its carotene content, under normal storage conditions to a much greater extent than has heretofore been achieved.

Another object of the invention is to provide a method of treating alfalfa prior to its dehydration to reduce the loss of carotene during the dehydration thereof.

Still another object of the invention is to provide a safe, inexpensive, and effective method of preparing alfalfa meal so that loss of pigments of the group comprising carotene, chlorophyll, xanthophyll, etc., is retarded.

A further object is to provide a method of preparing alfalfa meal to enhance its rich, green color and retard the loss thereof.

Yet another object is to provide a prepared alfalfa product of a rich green color in which loss of color during storage is greatly reduced.

Other objects of the invention, as will be apparent from the detailed description of preferred examples illustrating the preferred practice thereof, reside in the provision of subsidiary improvements contributing to the realization of the aforesaid objects.

With the above enumerated and other objects in view, the invention resides in the treatment of alfalfa with dispersions or solutions, and especially oil-solutions, of substituted diphenyl-amines, and especially mono-substituted diphenylamines, of which para-hydroxy diphenylamine, isopropoxy diphenylamine, and diphenyl-p-phenylene diamine are representative. The invention is based on my discovery that these substituted diphenylamines, and especially the diphenyl-p-phenylene diamine, and the iso-propoxy diphenylamine, properly applied to the alfalfa in very small and economically feasible concentrations greatly retard the decomposition of the pigments in the meal (especially the carotene and chlorophyll) without producing toxic effects when the meal is incorporated in mixed feeds, dog food, or the like, in normal or extra-normal proportions. The invention also comprises the methods of preparing and applying the dispersions or solutions and the improved product resulting from such application. It is not limited to the illustrated embodiments herein disclosed to exemplify the same, and is particularly pointed out in the appended claims.

In order to make the invention more clearly understood, there is shown in the accompanying drawings means for carrying the same into practical effect and examples of the results achieved by the invention, but without limiting the improvements in their useful application to the particular examples which, for purposes of explanation, have been selected to illustrate the invention.

In the accompanying drawings:

Fig. 1 is a diagram of apparatus suitable for the treatment of alfalfa meal in accordance with the invention.

Fig. 2 is a comparative chart showing the retardation of carotene loss during a period of storage at 55° C. by treatments with diphenyl-p-phenylene diamine, isopropoxy diphenylamine, and para-hydroxy diphenylamine, in accordance with the invention, as compared to the untreated control.

Fig. 3 is a comparative chart showing the retardation of carotene loss during a storage period of 70 days at a temperature of 80° F., by similar treatments.

Fig. 4 is a comparative diagram showing retardation of carotene loss during a storage period of 100 days at a temperature varying from 85 to 105° F. by treatments with parahydroxy-diphenylamine solutions in accordance with the invention, compared to untreated and oil treated controls.

Fig. 5 is a comparative diagram showing the growth of Golden Hamsters fed on diets differing only in substitution of treated meal for the untreated control.

Fig. 6 is a diagram of the light absorption spectra of the carotene fractions of the treated meals of Fig. 3, compared to that of the control showing the slight isomerization of the carotene caused by the treatments.

TREATING PROCEDURE

The form of apparatus shown in Fig. 1 of the accompanying drawings may be employed in practicing the treatments of the present invention. In this form of apparatus, the dehydrated alfalfa meal is fed into the feed-hopper 10 of a suitable mixer 11, a twin paddle mechanical mixer driven by a suitable motor 12 having been found satisfactory. The flow of meal through the mixer was adjusted to a constant rate of 100 lbs. per minute. The chemical solutions hereinafter described were delivered to the mixer in a fine spray by use of a large sized paint spray outfit having a five-gallon reservoir 13 equipped with a manually operated stirring device 14, which served as a convenient way of maintaining a uniform suspension in those instances in which the chemical did not form a completely uniform solution in the vehicle. The rate of supply of treating solution or dispersion through the spray nozzle 12 was controlled by regulating the air pressure supplied by the compressor 15 to the reservoir 13 from which it was fed to the atomizing nozzle 16, the air pressure being adjusted by trial prior to use, to deliver the required amount of treating material, and being maintained by use of a pressure gauge 17. Suitable provisions are desirably made to avoid throwing of the meal up against the spray nozzle or nozzles, and to recover the high carotene leaf dust when high speed agitation is employed.

In the mixer 11 the atomized treating solution is intimately mixed with the dehydrated alfalfa meal, and the treated meal is delivered to a sacking-off spout 18 or like receiver, and sacked in the usual manner.

While a spray-mixing system as shown is preferably employed for preparing the final treated meal in a single step, the invention in its broader aspect contemplates other modes of mixing, for example, the preparation of a potent concentrate of chemical solution in a smaller portion of alfalfa meal, which may be fed into the main meal stream at a suitable rate, for example, 100 lbs. of concentrate per 2,000 lbs. of meal.

PREPARATION OF TREATING MATERIALS

In the preferred practice of the invention, the chemical treating agents hereinafter described are dispersed, preferably in solution, in a suitable vehicle. A vehicle capable of soaking into the alfalfa is preferred, for example, a light mineral oil, or a comparable vegetable oil. More volatile solvents, as acetone, ethyl alcohol, dichloroethane, chloroform, and ethyl acetate may be employed with suitable precautions, but are not preferred, as the present research indicates that when used with volatile solvents, the treating agents are not as effective as when used with relatively non-volatile solvents such as mineral and vegetable oils. From this fact it is assumed that the oil and chemical solution penetrates the meal, thus remaining in close contact with the carotene, whereas the chemical in a volatile solvent is either quickly precipitated on the surface of the meal, or carried thereto by the rapidly evaporating solvent. Whatever the reason, the employment of a relatively non-volatile solvent has been found preferable.

The light mineral oil referred to herein is an oil comparable with "nujol" or "albolene," and is described by its manufacturer as "a highly aromatic oil of high specific gravity A. P. I. 34.0; of low viscosity (100° saybolt 100–105 seconds); o_or and taste satisfactory; unsulfonated residue percent min. 0.92", but the invention is not limited to the use of such an oil as the vehicle.

The quantity of vehicle employed is not overly critical. Excellent results have been obtained in treating a ton of alfalfa with two pounds of the chemical agent dissolved or dispersed in two gallons of the vehicle.

When the same quantity of chemical was employed dissolved in four gallons of the vehicle, no material improvement in carotene retention was observed. When one pound of the chemical was employed per ton, dispersed in one gallon of light mineral oil vehicle, much less retention of carotene was obtained. When, however, the chemicals, which were but sparingly soluble in mineral oil, were allowed to stand for several days covered with the oil, which was then decanted and used as a spray at the rate of two gallons per ton of meal, substantial preservation of carotene appeared to be effected, but not as efficiently as by the use of a dispersion or solution of two pounds of the material in two gallons of oil per ton.

Moreover, when a mineral oil including a solubilizer was employed, for example, a 12.5% solution of dodecylamine in mineral oil, or a 20.0% solution of ortho-aminobicyclohexyl in mineral oil, to cause the chemical agent to go into solution, it was found that two gallons of either of these solutions would completely dissolve two pounds of the chemicals and that extremely effective results were obtained using the resulting solution on the alfalfa in the same proportion. Other possible solubilizers include diethylamine and triethylamine, and the like. Acidic solubilizers should be avoided, as they tend to have a destructive effect on the pigments.

The present research has therefore disclosed that the dissolved chemical is much more effective than that which is merely suspended and that consistent with fine spraying and uniform mixing a relatively small quantity of a relatively non-volatile vehicle is to be preferred. It has also disclosed that the carotene stabilizing effect is generally parallel to the quantity of chemical added to the meal up to 1%, and that fortunately, the economically feasible treatment with but one-tenth of one percent of the chemicals, brings about substantially as high a degree of stabilization, over normal storage periods and under normal storage conditions, as any other concentration.

As illustrative of practical modes of applying the invention, specific examples of its application are set forth below, with the understanding that the invention is not restricted to such examples.

Example 1

(a) Diphenyl-p-phenylene diamine, which may be considered as a mono-substituted diphenyl-amine having the formula

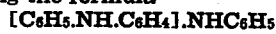
[C₆H₅.NH.C₆H₄].NHC₆H₅ was dispersed in light mineral oil, and intimately spray-mixed with the dehydrated alfalfa in the proportions of two pounds of chemical and two gallons of oil to the ton of alfalfa. The dispersion was effected by warming the suspension to about 100° C. and agitating the same.

Samples of the treated meal and of like untreated meal were stored at a temperature of 55° C. for seven days. Periodic analysis of portions of these samples were made and the carotene content in micrograms per gram was determined. The results are shown in Fig. 2, curve A, from which it will be observed that untreated meal, which initially contained 200 P. P. M. of carotene, after seven days retained only 60 P. P. M., while the same meal, treated with the chemical solution, retained over 165 P. P. M. of carotene.

(b) Samples of treated meal and control samples in accordance with this example were stored for seventy days at a temperature maintained between 70° and 80° F., and more closely approaching 80° F. Periodic analyses of portions of these samples were made and the carotene loss in percent was determined. The determined results are charted in Fig. 3, curve D, which shows that the carotene loss after such normal storage for seventy days was only about 17 percent, while the untreated control lost 73 percent of its carotene content. The reason for the apparent rise of the carotene content of the treated meal during the first thirty days is discussed hereinafter.

(c) It being known that the rate of carotene loss in untreated meals approximately doubles with each 10 degrees rise in temperature (see Guilbert, Journal of Nutrition, 10, 15, year 1943), and that untreated meals stored at —23 to —26° C. lose only 10 percent of their carotene in six months, while those stored at 80° C. lose 98 percent in sixteen days (see Wilder & Bethke, Poultry Science, 20, 304, year 1940), it will be perceived that the data charted may be used as a basis for prediction of effectiveness of the treatment to reduce carotene losses over different periods at other temperatures.

Example 2

(a) The procedure of Example 1 was repeated using a dispersion of isopropoxy diphenylamine—which may be considered as an alkoxy mono-substituted diphenylamine having the formula [C₆H₅.NH.C₆H₄].OC₃H₇—in light mineral oil, in the same proportions as in Example 1. Treated samples and the untreated controls were stored as in Example 1a. The results are shown in Fig. 2, curve B, which charts the observations showing that the treated alfalfa of this example approached, but did not quite equal, that of the first example in carotene retaining ability.

(b) Further samples of treated and control meal in accordance with this example were stored for seventy days and tested from time to time as in Example 1 (b). The results are charted in Fig. 3, curve E, which shows that the treatment with the isopropoxy substituted compound resulted in loss of only 21 percent of the carotene in seventy days storage, compared to loss of 73 percent in the untreated controls.

Example 3

(a) The procedure of Example 1 was repeated using a dispersion of para-hydroxy diphenylamine—the hydroxy mono-substituted diphenyl-amine having the formula [C₆H₅.NH.C₆H₄].OH— in light mineral oil in the same proportions as in Example 1. Treated samples and the untreated controls were similarly stored. The results are shown in Fig. 2, curve C, which records the observed fact that the para-hydroxy substituted compound is quite effective, but not as satisfactory in promoting carotene retention as the substituted compounds containing a plurality of carbon and hydrogen atoms in the substituent radical.

(b) Samples of treated and control meals in accordance with this example were stored for seventy days and tested as in Example 1 (b). The results are charted in Fig. 3, curve F, which shows that as in Fig. 2, the treatment with the para-hydroxy-diphenyl amine was not as effective as that with the substituted compounds containing a plurality of carbon and hydrogen atoms in the substituent radical. In this instance the treated meal lost about 31 percent of its carotene content in seventy days, compared to 73 percent for the untreated controls.

Example 4

Two pounds of diphenyl-p-phenylene diamine were added to two gallons of mineral oil. This mixture was warmed to 100° C. Small amounts (1–2%) of the chemical were dissolved. After standing for some time, the supernatant liquid was removed from the undissolved chemical.

The procedure of Example 1 was then repeated using the supernatant chemical-saturated oil as the treating agent, at the rate of two gallons per ton of meal. The carotene protecting effect, at least initially, was nearly but not quite as highly effective as the dispersion of Example 1.

Example 5

Two pounds of iso-propoxy diphenylamine were added to two gallons of mineral oil. This mixture was warmed to 100° C. Large quantities (15–25%) of the chemical were dissolved. The supernatant chemical-saturated oil solution, applied to dehydrated alfalfa meal at the rate of two gallons per ton, very effectively reduced carotene loss and loss of green color, this effectiveness being substantially equal to that of Example 2.

Example 6

Two pounds of p-hydroxy diphenylamine were added to two gallons of light mineral oil. This mixture was warmed to 100° C. Small quantities of the chemical (0.5–1%) were dissolved. The supernatant solution was used for treatment of dehydrated alfalfa at the rate of two gallons per ton. The retardation of loss of carotene and green color at least initially, was nearly, but not quite, as effective as the dispersion of Example 3. Comparison of Examples 4, 5 and 6 with Examples 1, 2 and 3 indicates that the effective chemical is that which is in solution and capable of penetrating the leaf structure.

EXAMPLE 7

Two pounds of diphenyl-p-phenylene diamine were dissolved in a solubilizer and oil solution consisting of 12.5% dodecylamine in mineral oil. The procedure of Example 1 was repeated using this solution as the treating agent, at the rate of two gallons per ton of meal. This very effectively reduced the loss of carotene, and appeared superior to the dispersion of Example 1.

EXAMPLE 8

The procedure of Example 7 was repeated substituting iso-propoxy diphenylamine. This effectively reduced the loss of carotene, and appeared slightly superior to the dispersion of Example 2.

EXAMPLE 9

The procedure of Example 7 was repeated substituting p-hydroxy diphenylamine. Again the carotene loss on storage was reduced, the results appearing somewhat better than with the dispersion of Example 3.

EXAMPLE 10

The procedure of Example 7 was repeated, employing as the solubilizer and oil solution a 20% solution of orthoamino bicyclohexyl in mineral oil. This agent completely dissolved the chemical, and the solution, used in the proportions of two gallons per ton, very markedly reduced the loss of carotene, being somewhat superior in this respect to the dispersion of Example 1.

EXAMPLE 11

The procedure of Example 8 was repeated, using the solubilizer-and-oil solution of Example 10. The resulting solution spray-mixed with the alfalfa at the rate of two gallons per ton, brought about substantial carotene stabilization and retention of green color, being superior in this respect to the dispersion of Example 2.

EXAMPLE 12

The procedure of Example 9 was repeated with the solubilizer-and-oil solution of Example 10. The carotene loss on storage was reduced, the results appearing better than with the dispersion of Example 3.

EXAMPLE 13

Two pounds of diphenyl-p-phenylene diamine were placed in two gallons of "Wesson oil," a cottonseed oil of the same grade as that intended for human consumption. The mixture was slightly warmed. Not all the chemical was dissolved; however, the supernatant cottonseed oil contained enough dissolved chemical to possess marked carotene protective properties, the results appearing somewhat superior to those of Example 1, when the solution was used on dehydrated alfalfa at the rate of two gallons per ton.

EXAMPLE 14

Two pounds of iso-propoxy diphenylamine were completely dissolved in two gallons of "Wesson oil." This solution, applied to dehydrated alfalfa in the same proportions, was more effective in preventing loss of carotene than the dispersion of Example 2.

EXAMPLE 15

Two pounds of p-hydroxy diphenylamine were completely dissolved in two gallons of "Wesson oil." Used in the same proportions as the solution of Example 9, comparable preservation of the carotene was effected.

EXAMPLE 16

Two pounds of diphenyl-p-phenylene diamine were dissolved in two gallons of volatile solvent, namely, acetone. (In using volatile solvents of this nature care must be taken because of the fire hazard.) This solution when applied to dehydrated alfalfa meal at the rate of two gallons per ton, very effectively protected the carotene, though not as effectively as the dispersion of Example 1.

EXAMPLE 17

Two pounds of iso-propoxy diphenylamine were dissolved in two gallons of volatile solvent, acetone being used. When applied to the meal at the rate of two gallons per ton, effective carotene protection was achieved, this being nearly as effective as the dispersion of Example 2.

EXAMPLE 18

Two pounds of p-hydroxy diphenylamine were dissolved in two gallons of volatile solvent, namely, acetone. Applied to dehydrated alfalfa meal in the same proportions, carotene preservation was affected, though not to the extent achieved in Example 3.

The treated meal, and an untreated control were stored at a constant temperature of 107° F. Results of the treatment are presented in Table I:

*Carotene loss in alfalfa meals treated with p-hydroxy-diphenylamine in volatile solvent (acetone) and stored at 107° F.*

TABLE I

| No. of days after treatment | Treated Samples | | Untreated Samples | |
|---|---|---|---|---|
| | Carotene | Loss | Carotene | Loss |
| | P. P. M. | Per cent | P. P. M. | Per cent |
| 0 | 288 | 0.0 | 288 | 0.0 |
| 6 | 274 | 4.8 | 240 | 16.6 |
| 10 | 258 | 5.5 | 210 | 12.5 |
| 16 | 240 | 7.0 | 185 | 11.9 |
| 26 | 226 | 6.6 | 164 | 11.3 |
| Total Carotene lost | | 22 | | 44 |

EXAMPLE 19

Diphenyl-p-phenylene diamine in dry powdered form was intimately mixed with dehydrated alfalfa meal in amounts varying from 1 to 10%. No carotene preserving effect, compared to untreated controls, could be detected.

EXAMPLE 20

Dry powdered iso-propoxy diphenylamine was applied as in Example 19. Again no carotene preserving effect was discernable.

EXAMPLE 21

Dry powdered p-hydroxy diphenylamine was applied as in Example 19. Again no carotene preserving effect could be found.

EXAMPLE 22

It was thought that very little success would be met with in attempting to employ mono-substituted diphenylamines as above exemplified for preserving large amounts of carotene during the dehydration of the alfalfa. Nevertheless, a suspension of p-hydroxy-diphenylamine in light mineral oil was prepared and used in the form of a spray on fresh growing alfalfa (3rd growth). Samples of sprayed and unsprayed alfalfa were cut immediately and taken to the laboratory for dehydration. After drying the leaves were separated from the stem and analyzed for the carotene product. They were then stored in open containers and portions analyzed every few days for their carotene content with the results shown in Table II:

Table II

| Days after Treatment | Sprayed Carotene | Unsprayed Carotene |
|---|---|---|
|  | P.P.M. | P.P.M. |
| 0 | 415 | 388 |
| 3 | 400 | 200 |
| 6 | 392 | 158 |

The rapid loss of carotene in the untreated meal was probably due to the incomplete inactivation of enzymes, as the meals were dried at 100° C. in the laboratory oven. This same drying procedure was used with both the treated and untreated materials, however, and the results are thus comparable. As shown in Table II, the untreated meal retained much less of its carotene both during drying, and in storage thereafter.

EXAMPLE 23

To determine whether the pigments could be preserved during sun drying fresh growing alfalfa was sprayed with solution as in Example 22. After spraying, the alfalfa was cut, along with a control sample, and the two samples were then allowed to sun-dry in the field for seven hours. At the end of this time the leaves were separated from the stems and analyzed for their carotene content.

This analysis showed that the sprayed and sun cured alfalfa retained 394 micrograms of carotene per gram, while the untreated sun cured alfalfa retained only 163 micrograms of carotene per gram.

EXAMPLE 24

Portions of alfalfa meal were treated respectively with parahydroxy diphenylamine dispersed in light mineral oil in the proportions of two pounds of chemical to two gallons of oil per ton of meal and with mineral oil alone in the proportion of two gallons of oil per ton of meal. One pound samples and control samples of the untreated meal were stored in open containers, indoors, but unprotected from light. The temperature varied from 85° F. to 105° F. Over a period of 100 days the untreated meal lost 75 percent of its carotene, the meal treated with parahydroxy diphenylamine lost only 21 percent. The periodic analyses of portions of the respective samples gave results as charted in Fig. 4, curves G and I, as compared to the untreated controls there charted. As above indicated, the parahydroxy-substituted diphenylamine is less effective than the other substituted compounds exemplified in Figs. 2 and 3.

The fact that the meal treated with oil solution alone (Fig. 4, curve I) showed very little, if any, effect compared with that resulting from the chemical treatments (curve G), appears to indicate that the improvements obtained are not due to a synergistic reaction of combined oil and chemical, and that other solvents and vehicles for the chemicals may be employed. Further observations discussed above and hereinafter tend to substantiate this conclusion.

PHYSIOLOGICAL DATA

The substituted diphenylamines above discussed are of low toxicity to humans. They have been fed to laboratory animals in quite large amounts (10 to 15 times the amounts incident to normal feeding) with no apparent ill effects. The growth curve of Golden Hamsters fed on purified vitamin-free casein supplemented with 50% treated and untreated meals, respectively, as a source of all vitamins except vitamin D which was supplied in the form of ergosterol, is shown in Fig. 5. As there shown, the effect of the treated meals on the growth curve, if any, favors the treated meal. At the end of the feeding trials both sets of animals were of the same appearance.

Chickens have been fed excessive amounts of the chemicals for from 8 to 10 weeks, with no indication of harmful effects.

ISOMERIZATION

Beta carotene may be isomerized into isomers which vary in their vitamin A activity. The most sensitive methods available have been employed in the analysis of the carotene fraction of samples of the treated meals, and it may be said that in the case of diphenyl-p-phenylene diamine there are definite signs of isomerization. This isomerization accounts for the apparent initial increase in carotene content in Fig. 2, curve A. (See also Fig. 3, curve D.) This apparent increase can be attributed to the rearrangement of the carotene molecule.

Such rearrangement makes itself evident in the light absorption spectra of the pigment as a shift in the wave lengths of maximum and minimum light absorptions, as shown in Fig. 6. From the comparative results of absorption study presented in Fig. 6, it is clear that the iso-propoxy diphenylamine (curve L) and the para-hydroxy diphenylamine (curve M) resulted in very slight isomerization, and that the diphenyl-p-phenylene diamine resulted in no harmful degree of isomerization. Chromatographically the extent of isomerization in any of the three meals is so slight that any reduction of vitamin A activity should be far overshadowed by the enhanced carotene content of the treated meals, even if the isomers formed are not those having vitamin A activities approaching that of the beta form.

PRESERVATION OF OTHER PIGMENTS

As above noted the trade judges the carotene content to some extent by the color of the meal. When analyses are asked, however, these are concerned only with the carotene content, and not with the content of other pigments as chlorophyll, for example. Accordingly, quantitative analyses of chlorophyll content have not been made.

The treatments of each of the above examples enhance, to a noticeable extent, the initial green color of the alfalfa meal. To a much more marked extent they delay and retard fading and loss of the green color on storage. Qualitatively, as well as theoretically, it is thus shown that treatments according to this invention reduce the loss not only of the carotene, but also of the chlorophyll indicative thereof, and of related pigments.

VARIATIONS

Half ton or more runs of treated meal were made with the solution of Example 3, using different proportions of solution per ton of meal. Small samples were picked from each bag of the respective run and mixed thoroughly to obtain an average sample of the run. The average samples were then stored at relatively high temperatures for several weeks to determine the effect of variation in the vehicle and chemical treatment. The results were as follows:

| Treatment | Per Cent Carotene Lost |
| --- | --- |
| Untreated Control | 23.8 |
| 1 gal. oil+1lb. chemical/ton | 22 |
| 2 gal. oil+2lb. chemical/ton | 7.2 |
| 4 gal. oil+2 lb. chemical/ton | 6.8 |

The indications of these runs coupled with the factors determined in the examples given above, indicate that for ordinary oil dispersions, approximately 2 lbs. of chemical dispersed in two gallons of oil per ton of meal, gives best results, that addition of more solvent or vehicle is not harmful, but is not of any appreciable benefit, and that that part of the chemical which is dissolved in the vehicle in a manner allowing it to penetrate into the leaf structure is probably the most effective.

Similarly it appears that in general, as well as when employing the concentrate-mixing variation of the method referred to above, the use of a vehicle which is not highly volatile is to be preferred.

Similarly, as between the several chemicals disclosed to exemplify the method, a tabulation of the data from Fig. 3 is informative:

| Treatment | Per cent Carotene Lost 70 days 80° F. |
| --- | --- |
| Untreated Control | 73 |
| P-hydroxy diphenylamine | 31 |
| Iso-propoxy diphenylamine | 21 |
| Diphenyl-p-phenylenediamine (anilino-substituted diphenylamine) | 17 |

This tabulation and other experimental work has lead to the conclusion that the mono-substituted diphenylamines having their substituents attached in the para position, and especially the alkoxy-mono-substituted diphenyl amines and like compounds in which the substituent radical contains a plurality of carbon and hydrogen atoms, are the most effective preservatives of carotene in alfalfa meal and the like, and that the members of the said group which, in the quantities employed, have no harmful or toxic effects are most eminently adapted for the preservation of carotene in mixed feeds and the like.

Under present market conditions, the cost of treatment with mineral oil dispersions in accordance with the above examples may amount to from $2.00 to $3.00 per ton. With increased consumption of the chemicals, the cost of treatment should be reduced.

From the foregoing it will be apparent that the present invention comprises a novel process by which preservation of carotene in alfalfa meal and the like may be cheaply and simply effected. Also important to note is the fact that should any step in the process be carried out to excess, no harmful effect, other than a waste of the treating materials, is apt to result. It will also be apparent that there has been invented a new and economically feasible dehydrated alfalfa meal product the constituents of which render it retentive of its carotene and other pigment contents to a much greater extent than has heretofore been attained.

While preferred embodiments of the invention have been shown and described, it is to be understood that the invention is not confined to the specific examples disclosed, and that the details of the method and the apparatus used in carrying it out, as well as the composition of the new product, may be varied by those skilled in the art without departing from the spirit of the invention as set forth in the following claims.

I claim:

1. The method of reducing the loss in pigment content, particularly carotene content, of prepared alfalfa products, which method comprises applying to the alfalfa a non-acidic treating agent comprising a tissue-penetrating vehicle and a small proportion, based on the alfalfa, of a pigment preserver selected from the group consisting of alkoxy-, hydroxy-, and anilino substituted diphenylamines.

2. The method of reducing the loss in pigment content, particularly carotene content, of prepared alfalfa products, which method comprises applying to the alfalfa a non-acidic treating agent comprising a tissue-penetrating vehicle and a small proportion, based on the alfalfa, of diphenyl-p-phenylene diamine.

3. The method of reducing the loss in pigment content, particularly carotene content, of prepared alfalfa products, which method comprises applying to the alfalfa a non-acidic treating agent comprising a tissue-penetrating vehicle and a small proportion, based on the alfalfa, of alkoxy mono-substituted diphenylamine.

4. The method of reducing the loss in pigment content, particularly carotene content, of prepared alfalfa products, which method comprises applying to the alfalfa a non-acidic treating agent comprising a tissue-penetrating vehicle and a small proportion, based on the alfalfa, of isopropoxy diphenylamine.

5. The method of reducing the loss in pigment content, particularly carotene content, of prepared alfalfa products, which method comprises applying to the alfalfa a non-acidic treating agent comprising a tissue-penetrating vehicle and a small proportion, based on the alfalfa, of para hydroxydiphenylamine.

6. A method according to claim 1 in which the application is effected by spraying the non-acidic mixture on freshly dehydrated alfalfa meal.

7. A method according to claim 1 in which the application is effected by spraying the non-acidic mixture on the fresh green alfalfa, followed by dehydration thereof.

8. A method according to claim 1 in which the vehicle comprises a tissue-penetrating oil selected from the class comprising light mineral and vegetable oils.

9. A method according to claim 1 in which the vehicle comprises a light mineral oil containing a solubilizer promoting dissolution of the preserving chemical therein.

10. A method according to claim 1 in which the vehicle comprises a vegetable oil in which the preserving chemical is soluble to a considerable extent.

11. A prepared alfalfa product in which the pigments present in the alfalfa are preserved by association therewith of a small proportion, based on the alfalfa, of a pigment preserver selected from the group consisting of alkoxy-, hydroxy-, and anilino-substituted diphenylamines.

12. A prepared alfalfa product in which the pigments present in the alfalfa are preserved by association therewith of a small proportion, based on the alfalfa, of residues of the intimate admixture therein of an oil dispersion comprising a chemical selected from the group consisting of alkoxy-, hydroxy-, and anilino-substituted diphenylamines.

13. A prepared alfalfa product in which the pigments present in the alfalfa are preserved by association therewith of a small proportion, based on the alfalfa, of diphenyl-p-phenylene diamine.

14. A prepared alfalfa product in which the pigments present in the alfalfa are preserved by association therewith of a small proportion, based on the alfalfa, of alkoxy mono-substituted diphenylamine.

15. A prepared alfalfa product in which the pigments present in the alfalfa are preserved by association therewith of a small proportion, based on the alfalfa, of isopropoxy diphenylamine.

16. A method according to claim 1 in which the treating agent comprises a light tissue-penetrating oil as the vehicle and further comprises a solubilizer promoting dissolution of the preserving chemical therein.

17. A treating agent for reducing the loss in pigment content of alfalfa products prepared therewith, consisting essentially of a light tissue-penetrating oil, a pigment preserver selected from the group consisting of alkoxy-, hydroxy-, and anilino-substituted diphenylamines, and a solubilizer promoting dissolution of the pigment preserver in the tissue-penetrating oil.

18. A treating agent for reducing the loss in pigment content of alfalfa products prepared therewith, consisting essentially of a light tissue-penetrating oil, a substantial proportion of diphenyl-p-phenylene diamine, and a solubilizer promoting dissolution of the diphenyl-p-phenylene diamine in the tissue-penetrating oil.

19. A treating agent for reducing the loss in pigment content of alfalfa products prepared therewith, consisting essentially of a light tissue-penetrating oil, a substantial proportion of alkoxy mono-substituted diphenylamine, and a solubilizer promoting dissolution of the substituted diphenylamine in the tissue-penetrating oil.

20. A treating agent for reducing the loss in pigment content of alfalfa products prepared therewith, consisting essentially of a light tissue-penetrating oil, a substantial quantity of isopropoxy diphenylamine, and a solubilizer promoting dissolution of the isopropoxy diphenylamine in the tissue-penetrating oil.

21. A treating agent for reducing the loss in pigment content of alfalfa products prepared therewith, consisting essentially of a light tissue-penetrating oil, a substantial quantity of para-hydroxy diphenylamine, and a solubilizer promoting dissolution of the para-hydroxy diphenylamine in the tissue-penetrating oil.

JOHN C. KEPHART.

REFERENCES CITED

The following references are of record in the file of this patent:

UNITED STATES PATENTS

| Number | Name | Date |
|---|---|---|
| 2,054,026 | Steindorff | Sept. 8, 1936 |
| 2,054,392 | Sharma | Sept. 15, 1936 |
| 2,103,188 | Semon | Dec. 21, 1937 |
| 2,198,214 | Musher | Apr. 23, 1940 |
| 2,221,333 | Sibley | Nov. 12, 1940 |
| 2,263,746 | Stanf | Nov. 25, 1941 |
| 2,295,753 | Paul | Sept. 15, 1942 |